United States Patent
Higuchi et al.

(10) Patent No.: US 11,884,755 B2
(45) Date of Patent: *Jan. 30, 2024

(54) MODIFIED POLYTETRAFLUOROETHYLENE, MOLDED PRODUCT, AND METHOD FOR PRODUCING STRETCHED POROUS MATERIAL

(71) Applicant: AGC Inc., Chiyoda-ku (JP)

(72) Inventors: Shinya Higuchi, Chiyoda-ku (JP); Shiro Ebata, Chiyoda-ku (JP); Takehiro Kose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 698 days.

This patent is subject to a terminal disclaimer.

(21) Appl. No.: 16/819,749

(22) Filed: Mar. 16, 2020

(65) Prior Publication Data

US 2020/0216583 A1 Jul. 9, 2020

Related U.S. Application Data

(63) Continuation of application No. PCT/JP2018/035492, filed on Sep. 25, 2018.

(30) Foreign Application Priority Data

Sep. 28, 2017 (JP) .................. 2017-187990

(51) Int. Cl.
| | | |
|---|---|---|
| C08F 14/26 | (2006.01) | |
| B29C 48/00 | (2019.01) | |
| C08F 214/26 | (2006.01) | |
| C08J 5/18 | (2006.01) | |
| B29K 27/18 | (2006.01) | |

(52) U.S. Cl.
CPC .......... *C08F 14/26* (2013.01); *B29C 48/0018* (2019.02); *B29C 48/022* (2019.02); *C08F 214/265* (2013.01); *C08J 5/18* (2013.01); *B29K 2027/18* (2013.01); *C08J 2327/22* (2013.01)

(58) Field of Classification Search
CPC ............. B29C 48/022; B29C 48/0018; B29K 2027/18; C08F 14/26; C08F 214/265; C08J 5/18; C08J 2327/22
See application file for complete search history.

(56) References Cited

U.S. PATENT DOCUMENTS

| | | |
|---|---|---|
| 2010/0036073 A1 | 2/2010 | Aten et al. |
| 2018/0142043 A1 | 5/2018 | Higuchi et al. |

FOREIGN PATENT DOCUMENTS

| | | | |
|---|---|---|---|
| JP | 2011-530629 A | | 12/2011 |
| JP | 2015-232082 A | | 12/2015 |
| WO | WO 2009/080713 | * | 7/2009 |
| WO | WO 2009/137736 A1 | | 11/2009 |
| WO | WO 2017/030094 A1 | | 2/2017 |

OTHER PUBLICATIONS

International Search Report dated Nov. 27, 2018 in PCT/JP2018/035492 filed Sep. 25, 2018.
Masato Sakaguchi, et al., "Copolymerizations Initiated by Mechano-Radicals on Particle Surfaces of Poly(tetrafluoroethylene)," Journal of Applied Polymer Science, vol. 22, 1978, pp. 2915-2924.

* cited by examiner

*Primary Examiner* — Patrick D Niland
(74) *Attorney, Agent, or Firm* — Oblon, McClelland, Maier & Neustadt, L.L.P.

(57) ABSTRACT

To provide a modified polytetrafluoroethylene excellent in breaking strength. The modified polytetrafluoroethylene comprises a polymer having units based on tetrafluoroethylene and a polymer having units based on a monomer represented by formula (1), wherein the content of the units based on a monomer represented by formula (1) is from 10 to 500 mass ppm, to all units in the modified polytetrafluoroethylene, and the standard specific gravity is from 2.155 to 2.175, $$CH_2=CR^1\text{-}L\text{-}R^2 \quad \text{Formula (1):}$$

wherein $R^1$ represents a hydrogen atom or an alkyl group, L represents a single bond, —CO—O—*, —O—CO—*, or —O—, * represents a bonding position to $R^2$, and $R^2$ represents a hydrogen atom, an alkyl group, or a nitrile group.

6 Claims, No Drawings

MODIFIED POLYTETRAFLUOROETHYLENE, MOLDED PRODUCT, AND METHOD FOR PRODUCING STRETCHED POROUS MATERIAL

TECHNICAL FIELD

The present invention relates to a modified polytetrafluoroethylene, a molded product and a method for producing a stretched porous material.

BACKGROUND ART

Polytetrafluoroethylenes are used for various applications because of their excellent properties.

Among them, with respect to a modified polytetrafluoroethylene using tetrafluoroethylene and another monomer, various studies have been made (Patent Document 1).

PRIOR ART DOCUMENT

Patent Document

Patent Document 1: WO2009/137736

DISCLOSURE OF INVENTION

Technical Problem

In recent years, a modified polytetrafluoroethylene excellent in breaking strength is demanded.

Here, usually at the time of producing a modified polytetrafluoroethylene, a fluorinated surfactant is used. However, in recent years, from the viewpoint of environmental problems, use of a fluorinated surfactant has been restricted. Therefore, a modified polytetrafluoroethylene which can be produced without using a fluorinated surfactant, is desired.

The present invention has an object to provide a modified polytetrafluoroethylene excellent in breaking strength.

Further, the present invention has an object to provide a molded product and a method for producing a stretched porous material.

Solution to Problem

The present inventors have made intensive studies to achieve the above objects, and as a result, have found it possible to achieve the above objects by the following constructions.

(1) A modified polytetrafluoroethylene comprising a polymer having units based on tetrafluoroethylene, and a polymer having units based on a monomer represented by the formula (1), wherein the content of the units based on a monomer represented by the formula (1) is from 10 to 500 mass ppm, to all units in the modified polytetrafluoroethylene, and the standard specific gravity is from 2.155 to 2.175,

$CH_2=CR^1\text{-}L\text{-}R^2$   Formula (1)

wherein $R^1$ represents a hydrogen atom or an alkyl group, L represents a single bond, —CO—O—*, —O—CO—* or —O—, * represents a bonding position to $R^2$, and $R^2$ represents a hydrogen atom, an alkyl group or a nitrile group.

(2) The modified polytetrafluoroethylene according to (1), wherein the content of the units based on a monomer represented by the formula (1) is from 30 to 100 mass ppm, to all units in the polytetrafluoroethylene.

(3) The modified polytetrafluoroethylene according to (1) or (2), wherein the monomer represented by the formula (1) is a monomer selected from the group consisting of a monomer represented by the formula (1-1), a monomer represented by the formula (1-2), a monomer represented by the formula (1-3), and a monomer represented by the formula (1-4),

$CH_2=CR^1\text{—}CO\text{—}O\text{—}R^3$   Formula (1-1)

$CH_2=CR^1\text{—}O\text{—}CO\text{—}R^4$   Formula (1-2)

$CH_2=CR^1\text{—}O\text{—}R^5$   Formula (1-3)

$CH_2=CR^1\text{—}R^6$   Formula (1-4)

wherein $R^1$ represents a hydrogen atom or an alkyl group, $R^3$ represents a hydrogen atom or an alkyl group, $R^4$ represents an alkyl group, $R^5$ represents an alkyl group, and $R^6$ represents a nitrile group.

(4) The modified polytetrafluoroethylene according to any one of (1) to (3), wherein the monomer represented by the formula (1) is a monomer represented by the formula (1-1).

(5) The modified polytetrafluoroethylene according to any one of (1) to (4), wherein the modified polytetrafluoroethylene is in a particulate form, and its average primary particle size is from 0.20 to 0.30 μm.

(6) The modified polytetrafluoroethylene according to any one of (1) to (5), which is for paste extrusion molding.

(7) A molded product formed by paste extrusion molding of the modified polytetrafluoroethylene as defined in any one of (1) to (6).

(8) A method for producing a stretched porous material, which comprises subjecting the modified polytetrafluoroethylene as defined in any one of (1) to (6) to paste extrusion to obtain an extruded bead, and stretching the extruded bead to obtain a stretched porous material.

Advantageous Effects of Invention

According to the present invention, it is possible to provide a modified polytetrafluoroethylene excellent in breaking strength.

Further, according to the present invention, it is possible to provide a molded product using the modified polytetrafluoroethylene, and a method for producing a stretched porous material.

DESCRIPTION OF EMBODIMENTS

Meanings of terms in the present invention are as follows.

A "unit" is a general term for an atomic group derived from one molecule of a monomer, formed directly by polymerization of the monomer. To all units which a polymer comprises, the content of each unit (mass %) is obtainable by analyzing the polymer by a solid-state nuclear magnetic resonance spectra (NMR) method, but it can be estimated from the charged amount of each monomer. Usually, the content of each unit calculated from the charged amount of each monomer is substantially coincident with the actual content of each unit.

A characteristic point of a modified polytetrafluoroethylene of the present invention (hereinafter referred to also as a "modified PTFE") is such a point that it comprises a polymer having units (hereinafter referred to also as "TFE units") based on tetrafluoroethylene (hereinafter referred to also as "TFE") and a polymer having units (hereinafter referred to also as "units A") based on a monomer (hereinafter referred to also as a "monomer A") represented by the later-described formula (1) to be contained in a predetermined amount. Surprisingly, the modified PTFE of the above composition is excellent in breaking strength.

As will be described later, the modified PTFE of the present invention can be produced without using a fluorinated surfactant.

Hereinafter, a polymer having units A will be referred to also as a "polymer A".

<Modified PTFE>

The modified PTFE of the present invention comprises a polymer having TFE units, and a polymer having units A.

The modified PTFE of the present invention may be a mixture of a polymer having TFE units and a polymer having units A, or it may be a mixture further containing a copolymer comprising TFE units and units A. As the preferred production method for modified PTFE as described below suggests, it is considered that the modified PTFE of the present invention is not only composed of only a mixture of the respectively independent polymers i.e. the polymer having TFE units and the polymer having units A, but may sometimes contain a copolymer having TFE units and units A.

(Polymer Having TFE Units)

The modified PTFE contains a polymer having TFE units.

The modified PTFE usually contains a polymer having TFE units, as the main component. The main component is meant that to all units in the modified PTFE, the content of the polymer having TFE units is at least 99.700 mass %, preferably at least 99.900 mass %.

(Monomer Represented by the Formula (1))

The modified PTFE contains a polymer having units A derived from a monomer A, i.e. a polymer A.

$CH_2=CR^1-L-R^2$ 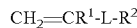 Formula (1)

$R^1$ represents a hydrogen atom or an alkyl group. The number of carbon atoms in the alkyl group is preferably from 1 to 3, more preferably 1.

L represents a single bond, —CO—O—*, —O—CO—* or —O—. * represents a bonding position to $R^2$. For example, when L is a —CO—O—*, the formula (1) represents $CH_2=CR^1-CO-O-R^2$.

$R^2$ represents a hydrogen atom, an alkyl group or a nitrile group.

The number of carbon atoms in the alkyl group is preferably from 1 to 10, more preferably from 1 to 6, further preferably from 1 to 4.

The alkyl group may be linear or may be cyclic. When the alkyl group is cyclic, it corresponds to a cycloalkyl group.

The monomer A is preferably a monomer selected from the group consisting of a monomer represented by the formula (1-1), a monomer represented by the formula (1-2), a monomer represented by the formula (1-3), and a monomer represented by the formula (1-4).

$CH_2=CR^1-CO-O-R^3$ 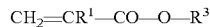 Formula (1-1)

$CH_2=CR^1-O-CO-R^4$ 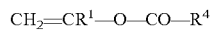 Formula (1-2)

$CH_2=CR^1-O-R^5$ 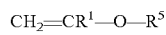 Formula (1-3)

$CH_2=CR^1-R^6$  Formula (1-4)

The definition of $R^1$ is as described above.

$R^3$ represents a hydrogen atom or an alkyl group, preferably an alkyl group having from 1 to 6 carbon atoms.

$R^4$ represents an alkyl group, preferably an alkyl group having from 1 to 3 carbon atoms, more preferably a methyl group.

$R^5$ represents an alkyl group, and is preferably a linear alkyl group or a cyclic alkyl group.

$R^6$ represents a nitrile group.

The monomer A may, for example, be methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, or cyclohexyl vinyl ether.

As the fluorine-free monomer, a monomer represented by the formula (1-1) and a monomer represented by the formula (1-2) are preferred, and a monomer represented by the formula (1-1) wherein $R^3$ is an alkyl group having from 1 to 6 carbon atoms is particularly preferred.

The content proportion of units A in the modified PTFE is from 10 to 500 mass ppm, to the content of units based on all monomers in the modified PTFE. If the content of units A is less than 10 mass ppm, or exceeds 500 mass ppm, the breaking strength of the modified PTFE will be inferior.

Especially, from such a viewpoint that the breaking strength of the modified PTFE will be more excellent, the content of units A is preferably from 10 to 200 mass ppm, more preferably from 20 to 200 mass ppm, further preferably from 30 to 150 mass ppm, particularly preferably from 30 to 100 mass ppm.

As the monomer A, one type may be used alone, or two or more types may be used in combination. In the case of using two or more monomers A, the total content of units A based on the respective monomers A may be within the above range.

The modified PTFE may contain units other than TFE units and units A, in a range not to impair the effects of the present invention.

Here, the total content of TFE units and units A is preferably at least 99.700 mass %, more preferably at least 99.800 mass %, to all units in the modified PTFE. As the upper limit, 100 mass % may be mentioned.

The standard specific gravity (hereinafter referred to also as "SSG") of the modified PTFE is from 2.155 to 2.175. Especially, from such a viewpoint that the breaking strength of the modified PTFE will be more excellent, it is preferably from 2.155 to 2.170, more preferably from 2.160 to 2.170.

SSG is an index for the molecular weight, and the larger the SSG, the smaller the molecular weight.

The above SSG can be adjusted by polymerization conditions (polymerization pressure, etc.) at the time of producing the modified PTFE.

SSG of the modified PTFE is measured in accordance with ASTM D4895-04.

The state of the modified PTFE is preferably particulate from the viewpoint of e.g. handling efficiency.

The average primary particle size of the modified PTFE particles is preferably from 0.10 to 0.50 μm, more preferably from 0.15 to 0.30 μm, further preferably from 0.20 to 0.30 μm. When the average primary particle size is at least 0.10 μm, paste extrusion molding can be carried out at a low extrusion pressure, and a molded product excellent in surface smoothness having no such undulation on the surface, can be easily obtained. When the average primary particle size is at most 0.50 μm, spaces among the particles during extrusion tend to be reduced, whereby extrusion stability will be excellent, and as a result, a molded product excellent in surface smoothness can be easily obtained.

The average primary particle size of the modified PTFE particles corresponds to D50 measured by, for example, a laser scattering method particle size distribution analyzer. As will be described later, in the case of producing the modified PTFE in an aqueous medium, by using the obtainable aqueous dispersion of the modified PTFE particles, the above measurement may be carried out to obtain the average primary particle size of the modified PTFE particles.

The extrusion pressure for the modified PTFE is preferably from 18.0 to 35.0 MPa, more preferably from 20.0 to 25.0 MPa, from such a viewpoint that the paste extrusion will thereby be easy.

Measurement of the extrusion pressure is as follows.

A sample (modified PTFE) (100 g) left to stand at room temperature for at least 2 hours, is put into a glass bottle having an internal capacity of 500 mL, and 21.7 g of a lubricating oil (Isopar H (registered trademark), manufactured by Exxon Corporation) is added and mixed for 3 minutes to obtain a mixture. The obtained mixture is left to stand in a 25° C. thermostatic bath for 2 hours, and then subjected to paste extrusion through an orifice at an introduction angle 30° with a diameter of 2.5 cm and a land length of 1.1 cm at 25° C. under conditions of a reduction ratio (ratio of the cross-sectional area of the inlet to the cross-sectional area of the outlet of the die) of 100 and an extrusion speed of 51 cm/min, to obtain an extruded bead (cord-like material). The pressure required for extrusion at that time is measured and adopted as the extrusion pressure (unit: MPa).

The breaking strength A of the modified PTFE is preferably at least 5.0N, more preferably at least 8.0N. The breaking strength A of the modified PTFE is usually at most 50N.

Measurement of the breaking strength A is as follows.

An extruded bead is obtained in the same manner as in the method for measurement of the extrusion pressure, and it is dried at 230° C. for 30 minutes, to remove the lubricant. Then, the extruded bead is cut into a suitable length, and both ends are fixed so that the clamp interval becomes to be 5.1 cm, followed by heating to 300° C. in an air circulating oven. Continuously, stretching is carried out under conditions of a stretching rate of 100%/sec and a stretching ratio of 2,400%, to obtain a modified PTFE stretched porous material (hereinafter referred to as a stretched bead).

With respect to samples from the respective ends of the stretched bead (if there is any neck-down in the clamped ranges, excluding such neck-down) and a sample obtainable from the center of the stretched beading, i.e. a total of three samples, the tensile breaking load forces are, respectively, measured by using a tensile tester (manufactured by A&D Company, Limited), whereby the minimum value is adopted as the breaking strength A.

In the measurement by the tensile tester, the sample is sandwiched and fixed by movable jaws with a gauge length of 5.0 cm, and the movable jaws are driven at room temperature (24° C.) at a speed of 300 mm/min, to impart a tensile stress.

The stress relaxation time of the modified PTFE is preferably at least 100 seconds, more preferably at least 110 seconds, further preferably at least 115 seconds, from such a viewpoint that the heat resistance of the modified PTFE will be more excellent. The stress relaxation time of the modified PTFE is usually at most 700 seconds.

Measurement of the stress relaxation time is as follows.

Under conditions of a clamping interval of 3.8 cm, a stretching rate of 1,000%/sec and a total stretching of 2,400%, in the same manner as in the measurement of the breaking strength, an extruded bead is stretched, and both ends of a sample of this stretched bead obtained are fixed by jigs, whereby the time required for the sample to be broken when left to stand in an oven of 390° C. is obtained.

The breaking strength B of the modified PTFE to be measured by the method as described later, is preferably at least 21.0N, more preferably at least 23.0N. The breaking strength B of the modified PTFE is usually at most 70N.

Measurement of the breaking strength B is as follows.

In the same manner as in the evaluation of the stress relaxation time, an extruded bead is stretched to obtain the same sample as the sample for measurement of the stress relaxation time. Then, using the obtained sample, the same measurement as the measurement of the breaking strength is conduced to obtain the value of the breaking strength B.

As the method for producing the above modified PTFE, a known method may be adopted. However, in a known method, particularly in a known production method using an emulsion polymerization method, a fluorinated surfactant is usually used. But, as described above, from the viewpoint of environmental problems, it is preferred to produce the modified PTFE without using a fluorinated surfactant.

The modified PTFE of the present invention is preferably a modified PTFE produced without using a fluorinated surfactant, i.e. a modified PTFE obtained by polymerizing TFE in the absence of a fluorinated surfactant.

Further, the modified PTFE of the present invention containing no fluorinated surfactant, is preferably a modified PTFE obtained by polymerizing TFE in an aqueous medium in which a polymer A containing units A is present.

The above aqueous medium in which a polymer A is present, is preferably an aqueous medium in which a polymer A is present which is obtained by polymerizing a monomer A in the aqueous medium. In each of the polymerization of a monomer A in an aqueous medium and the polymerization of TFE in an aqueous medium in which a polymer A is present, by conducting the polymerization in the absence of a fluorinated surfactant, it is possible to produce a modified PTFE containing no fluorinated surfactant.

As one of preferred embodiments of the method for producing a modified PTFE, an embodiment having the following two steps may be mentioned.

Step 1: a step of conducting polymerization of a monomer A in an aqueous medium, to obtain the aqueous medium containing a polymer A Step 2: a step of conducting polymerization of TFE in the aqueous medium in which the polymer A is present, to obtain a modified PTFE.

In the following, the procedures of the respective steps will be described in detail.

<Step 1>

Step 1 is a step of conducting polymerization of a monomer A in an aqueous medium, to obtain the aqueous medium containing a polymer A.

In the following, first, materials to be used in step 1 will be described in detail, and then, the procedure in step 1 will be described in detail.

The definition of a monomer A is as described above.

(Aqueous Medium)

The aqueous medium may, for example, be water, or a mixture of water and a water-soluble organic solvent.

The water-soluble organic solvent may, for example, be tert-butanol, propylene glycol or dipropylene glycol. The aqueous medium is preferably composed of water only.

(Polymerization Initiator)

In step 1, a polymerization initiator may be used. That is, at the time of the polymerization of a monomer A, a polymerization initiator may be used.

As the polymerization initiator, a water-soluble radical initiator or a water-soluble redox catalyst is preferred.

The water-soluble radical initiator is preferably a persulfate such as ammonium persulfate or potassium persulfate, or a water-soluble organic peroxide such as disuccinic acid peroxide, bisglutaric acid peroxide, tert-butyl hydroperoxide or the like.

The water-soluble redox catalyst is preferably a combination of an oxidizing agent, such as a bromic acid or a salt thereof, a chloric acid or a salt thereof, a persulfuric acid or a salt thereof, a permanganic acid or a salt thereof, or hydrogen peroxide, and a reducing agent, such as sulfurous acid or a salt thereof, hydrogen sulfide or a salt thereof, thiosulfate or a salt thereof, or an organic acid. Among them, a combination of a bromic acid or a salt thereof, and sulfurous acid or a salt thereof, or ammonium sulfite, or a combination of permanganic acid or a salt thereof, or potassium permanganate, and oxalic acid, is more preferred.

As the polymerization initiator, ammonium persulfate alone or a mixed system of a persulfate and disuccinic acid peroxide, is preferred; ammonium persulfate alone or a mixed system of ammonium persulfate and disuccinic acid peroxide, is more preferred; and ammonium persulfate alone is further preferred.

As the polymerization initiator, one type may be used alone, or two or more types may be used in combination.

Further, as the method for charging the polymerization initiator, the entire amount may be charged to the polymerization system before initiating the polymerization reaction, or it may be added continuously or intermittently to the polymerization system.

(Procedure in Step)

In step 1, the polymerization of a monomer A is conducted in an aqueous medium. Specifically, it is preferred to mix the monomer A and the aqueous medium, and to conduct the polymerization of the monomer A in the obtained mixture.

The amount (charging amount) of the monomer A is adjusted so that the content of units A becomes to be from 10 to 500 mass ppm, to all units in the obtainable modified PTFE.

Here, the method for charging the monomer A is preferably initial batch addition wherein the entire amount is charged to the polymerization system in advance before initiating the polymerization reaction.

The content of the monomer 1 in the solution obtainable by mixing the monomer 1 and the aqueous medium is preferably from 0.0005 to 0.0080 mass %, more preferably from 0.0005 to 0.0030 mass %, to the total mass of the solution.

The amount of the polymerization initiator to be used is preferably from 0.2 to 1,000 mass %, more preferably from 0.2 to 500 mass %, to the entire amount of the monomer A.

The polymerization temperature of the monomer A is preferably from 10 to 95° C., more preferably from 50 to 90° C. The polymerization time is preferably from 5 to 400 minutes, more preferably from 5 to 300 minutes.

The pressure condition at the time of the polymerization is preferably a vacuum condition or an atmospheric condition.

Further, by adjusting the atmosphere at the time of the polymerization to be a TFE atmosphere, the polymerization may be carried out. Here, usually, polymerization of the monomer A in an aqueous medium proceeds in preference to polymerization of TFE.

In the above step 1, an aqueous medium containing a polymer A is obtained, in which particles of the polymer A are dispersed in the aqueous medium. At the time of polymerization of TFE in the later described step 2, although the particles of the polymer A are not an emulsifier, due to the balance of interfacial tensions to both of the aqueous medium and the modified PTFE particles during polymerization, particles of the polymer A are considered to be present at the boundary of the both and thus to contribute to the dispersion stabilization in the aqueous medium of the modified PTFE particles. Particles of the modified PTFE obtained by step 2 are particles containing particles of the polymer A.

The particle size of particles of the polymer A is preferably from 0.1 to 100 nm, more preferably from 0.1 to 50 nm.

Particles of the polymer A are composed of a polymer comprising units A.

The polymer A usually comprises only units A, but may contain units based on a fluorinated monomer within a range not to impair the effects of the present invention. The fluorinated monomer is a monomer having fluorine atoms, and, for example, TFE may be mentioned.

The content of units A in the polymer A is preferably at least 90 mass %, more preferably at least 95 mass %, to all units in the polymer A. As the upper limit, 100 mass % may be mentioned.

<Step 2>

Step 2 is a step of conducting polymerization of TFE in the aqueous medium in which the polymer A is present, to obtain a modified PTFE.

In the following, first, the materials to be used in step 2 will be described in detail, and then, the procedure in step 2 will be described in detail.

(Polymerization Initiator)

In step 2, a polymerization initiator may be used. That is, a polymerization initiator may be used at the time of the polymerization of TFE.

The polymerization initiator to be used may be a polymerization initiator as described in step 1.

As the polymerization initiator, a mixed system of a persulfate and disuccinic acid peroxide, is preferred, and a mixed system of ammonium persulfate and disuccinic acid peroxide is more preferred.

The amount of the polymerization initiator to be used is preferably at least 0.10 mass %, more preferably from 0.10 to 1.5 mass %, further preferably from 0.20 to 1.0 mass %, to the total amount of TFE to be supplied to the polymerization system.

(Surfactant)

In step 2, together with the polymer A, it is preferred to use a fluorine-free surfactant. That is, it is preferred to carry out the polymerization of TFE in the presence of a fluorine-free surfactant together with the polymer A.

The fluorine-free surfactant is a surfactant having a hydrophobic portion composed of an organic group containing no fluorine atoms. The fluorine-free surfactant preferably contains no fluorine atoms in a portion other than the hydrophobic portion such as a hydrophilic portion, etc.

As the fluorine-free surfactant, a hydrocarbon type surfactant is preferred. The hydrocarbon type surfactant is a surfactant wherein the hydrophobic portion is made of a hydrocarbon. The hydrocarbon type surfactant may be any of anionic, nonionic and cationic, and a hydrocarbon type anionic surfactant is preferred. Here, in the above hydrocarbon, an oxygen atom (—O—) may be contained. That is, it may be a hydrocarbon containing oxyalkylene units.

The number of carbon atoms contained in the above hydrocarbon group is preferably from 5 to 20.

The counter cation to the anion of the hydrocarbon type anionic surfactant may, for example, be $H^+$, $Na^+$, $K^+$, $NH_4^+$, $NH(EtOH)_3^+$ or the like.

The hydrocarbon type anionic surfactant may, for example, be sodium dodecyl sulfate, sodium lauryl sulfate, ammonium lauryl sulfate, polyoxyethylene lauryl ether sodium sulfate, polyoxyethylene lauryl ether ammonium sulfate, sodium dodecylbenzenesulfonate, sodium di(2-ethylhexyl)sulfosuccinate, sodium laurate, or ammonium laurate.

As the hydrocarbon type surfactant, one type may be used alone, or two or more types may be used in combination.

(Aqueous Medium)

As the aqueous medium containing the polymer A in step 2, an aqueous medium containing the polymer A obtained in step 1, or an aqueous medium containing the polymer A, which is obtainable by diluting the aqueous medium containing the polymer A obtained in step 1 with an aqueous medium, may be used. The aqueous medium for dilution may be the same aqueous medium as the aqueous medium used in step 1, or may be a different aqueous medium.

(Stabilizing Aid)

In step 2, a stabilizing aid which is commonly used in emulsion polymerization for PTFE may be used. The stabilizing aid is not one which brings about interference with polymerization of the monomer A in step 1, and therefore, by letting it be present in the aqueous medium to be used in step 1, polymerization of the monomer A may be conducted, and the obtained polymer A-containing aqueous medium containing the stabilizing aid, may be used in step 2.

As the stabilizing aid, paraffin wax, a fluorinated solvent or silicone oil is preferred, and paraffin wax is more preferred. The paraffin wax may be liquid, semi-liquid or solid at room temperature. Especially, a saturated hydrocarbon having at least 12 carbon atoms, is preferred. The melting point of the paraffin wax is preferably from 40 to 65° C., more preferably from 50 to 65° C.

As the stabilizing aid, one type may be used alone, or two or more types may be used in combination.

(Other)

Further, in step 2, monomers other than TFE may be used within a range not to impair the effects of the present invention, but from such a viewpoint that various characteristics of modified PTFE will be more excellent, the total amount of TFE is preferably at least 99.5 mass % to the total amount of monomers to be used in step 2. Especially, it is more preferred to use only TFE as the monomer in step 2.

(Procedure in Step)

In a usual way, TFE is introduced into the polymerization system (that is, the polymerization reaction vessel). Specifically, TFE is introduced continuously or intermittently into the polymerization system so that the polymerization pressure becomes to be a predetermined pressure.

In a case of using a polymerization initiator, the polymerization initiator may be added all at once to the polymerization system, or may be added dividedly.

The polymerization temperature of TFE is preferably from 10 to 95° C., more preferably from 15 to 90° C. The polymerization pressure is preferably from 0.5 to 4.0 MPa, more preferably from 0.6 to 3.5 MPa. The polymerization time is preferably from 90 to 520 minutes, more preferably from 90 to 450 minutes.

Further, step 1 and step 2 may be carried out continuously in the same polymerization reaction vessel.

Further, in the production method of the present invention, it is sufficient that particles of the polymer A are formed in step 1, and step 2 may be conducted before the monomer A is completely consumed in step 1.

By the above procedure, an aqueous dispersion having modified PTFE dispersed in the form of particles (aqueous dispersion containing modified PTFE particles) is obtainable. The concentration of the modified PTFE particles in the aqueous dispersion is preferably from 10 to 45 mass %, more preferably from 15 to 45 mass %, further preferably from 20 to 43 mass %. Within the above range, the modified PTFE particles in the aqueous dispersion can be more easily coagulated, and white turbidity of the coagulation liquid can be suppressed.

The preferable range of the average primary particle size of the modified PTFE particles is as described above.

In the foregoing, an embodiment of conducting step 1 has been described, but another method may be used, so long as polymerization of TFE is conducted in an aqueous medium in the presence of particles of the polymer A. For example, it may be a method wherein particles of the polymer A separately prepared, are added into an aqueous medium, and then, polymerization of TFE is conducted in the aqueous medium.

<Modified PTFE Powder>

By the above-described procedure of the production method, an aqueous dispersion containing modified PTFE is obtainable.

Here, a method of obtaining a modified PTFE powder composed of modified PTFE particles (modified PTFE fine powder) from the aqueous dispersion containing modified PTFE particles may, for example, be a method of coagulating modified PTFE particles.

Specifically, for example, by diluting with water so that the concentration of the modified PTFE in the aqueous dispersion containing modified PTFE particles becomes to be from 8 to 25 mass %, the temperature of the aqueous dispersion is adjusted to from 5 to 35° C., and then, the aqueous dispersion is vigorously stirred to coagulate modified PTFE particles. At that time, the pH may be adjusted as the case requires. Further, a coagulating aid such as an electrolyte or a water-soluble organic solvent may be added to the aqueous dispersion.

Thereafter, moderate agitation is conducted, and the coagulated modified PTFE particles are separated from water, and the obtained wet powder (wet fine powder) is granulated and sieved, as the case requires, followed by drying as the case requires. Thus, a modified PTFE powder is obtainable.

The above drying is conducted in a state of not letting the wet powder flow so much, preferably by letting it be left to stand still. The drying method may, for example, be vacuum drying, radio frequency drying or hot air drying.

The drying temperature is preferably from 10 to 300° C., more preferably from 100 to 250° C.

Especially, the drying of the undried modified PTFE powder is preferably carried out in an atmosphere containing ammonia. Here, the atmosphere containing ammonia means an atmosphere in which ammonia gas can be in contact with the undried modified PTFE powder. For example, it means an atmosphere containing ammonia gas, or an atmosphere in which ammonia or a compound which generates ammonia, is dissolved in water containing the undried modified PTFE powder, and ammonia gas will be generated by heating.

The compound which generates ammonia may, for example, be an ammonium salt or urea. Such a compound will be decomposed by heating to generate ammonia gas.

When the undried modified PTFE powder is dried in an atmosphere containing ammonia, without impairing the physical properties, it is possible to lower the paste extrusion pressure of the modified PTFE powder.

<Molded Product>

The modified PTFE as described above is suitably applicable for paste extrusion molding.

The modified PTFE (especially, the modified PTFE powder) is subjected to paste extrusion molding, whereby a desired molded product will be obtained.

The paste extrusion molding is a method in which the modified PTFE powder and a lubricant are mixed, to let the modified PTFE powder have a fluidity, and the mixture is extrusion molded, to form a molded product of, for example, a film or a tube.

The mixing proportion of the lubricant may be suitably selected so that the modified PTFE powder has a fluidity, and, for example, when the total amount of the modified PTFE powder and the lubricant is 100 mass %, it is preferably from 10 to 30 mass %, more preferably from 15 to 20 mass %.

As the lubricant, for example, naphtha or a petroleum type hydrocarbon having a dry point of at least 100° C. is preferred.

To the mixture, an additive such as a pigment may be added for the purpose of coloration, or various fillers may be added for the purpose of imparting e.g. strength and conductivity.

The shape of the molded product may, for example, be tubular, sheet, film or fibrous. Applications may, for example, be tubes, covering for electric wires, sealing materials, porous membranes and filters.

Further, the modified PTFE powder may be paste-extruded to obtain an extruded bead, and the extruded bead may be stretched to obtain a stretched porous material of modified PTFE. The stretching conditions may, for example, be a rate of from 5 to 1,000%/sec and a stretching ratio of at least 500%.

The shape of an article made of the stretched porous material may, for example, be tubular, sheet, film or fibrous.

EXAMPLES

In the following, the present invention will be described in more detail with reference to Examples and Comparative Examples, but the present invention is not limited thereto.

Various measuring methods and evaluation methods are as follows.

(A) Average Primary Particle Size (Nm) of Modified PTFE Particles (Hereinafter Referred to Also as "PPS")

Measured by means of a laser scattering method particle size distribution analyzer (manufactured by Horiba, Ltd., trade name "LA-920") by using an aqueous dispersion of modified PTFE particles as a sample.

(B) Standard Specific Gravity (SSG)

Measured in accordance with ASTM D4895-04.

12.0 g of a sample (modified PTFE powder) was weighed, and held in a cylindrical mold having an inner diameter of 28.6 mm under 34.5 MPa for 2 minutes. This sample was put in an oven of 290° C. and heated at 120° C./hr. Further, after maintaining at 380° C. for 30 minutes, the temperature was lowered at 60° C./hr and held at 294° C. for 24 minutes. The sample was held in a desiccator of 23° C. for 12 hours, then, the specific gravity value to water of the sample at 23° C. was measured, and this value was adopted as the standard specific gravity. As the value of SSG is small, the molecular weight is large.

(C) Measurement of Extrusion Pressure

A modified PTFE powder (100 g) left to stand at room temperature for at least 2 hours, was put into a glass bottle having an internal capacity of 500 mL, and a lubricating oil (Isopar H (registered trademark), manufactured by Exxon Corporation) (21.7 g) was added and mixed for 3 minutes to obtain a mixture. The obtained mixture was left to stand in a 25° C. thermostatic bath for 2 hours, and then subjected to paste extrusion through an orifice at an introduction angle of 30° with a diameter of 2.5 cm and a land length of 1.1 cm at 25° C. under conditions of a reduction ratio (ratio of the cross-sectional area of the inlet to the cross-sectional area of the outlet of the die) of 100 and an extrusion speed of 51 cm/min, to obtain an extruded bead (cord-like material). The pressure required for extrusion at that time was measured and adopted as the extrusion pressure (unit: MPa).

(D) Measurement of Breaking Strength A

An extruded bead was obtained in the same manner as in the measurement of the extrusion pressure, and it was dried at 230° C. for 30 minutes, to remove the lubricant. Then, the extruded bead was cut into a suitable length, and both ends were fixed so that the clamp interval became 5.1 cm, followed by heating to 300° C. in an air circulating oven. Continuously, stretching was conducted under conditions of a stretching rate of 100%/sec and a stretching ratio of 2,400%, to obtain a modified PTFE stretched porous material (hereinafter referred to as a stretched bead).

With respect to samples obtainable from the respective ends of the stretched bead (if there is any neck-down in the clamped region, excluding the neck-down), and a sample obtainable from the center of the stretched bead, i.e. a total of three samples, the tensile breaking load forces were, respectively, measured, by means of a tensile tester (manufactured by A&D Company, Limited), and the minimum value was adopted as the breaking strength A.

In the measurement by the tensile tester, the sample was sandwiched and fixed by movable jaws having a gauge length of 5.0 cm, and the movable jaws were driven at room temperature (24° C.) at a speed of 300 mm/min to impart a tensile stress.

(E) Measurement of Stress Relaxation Time

Under conditions of a clamp interval of 3.8 cm, a stretching rate of 1,000%/sec and a total stretching of 2,400%, in the same manner as in the measurement of the breaking strength, an extruded bead was stretched, to prepare a sample for measurement of the stress relaxation time. Both ends of this sample were fixed by fixtures and pulled taut to make the total length to be 25 cm. The stress relaxation time was obtained by the time required for this sample to be broken when it was left in an oven of 390° C.

(F) Measurement of Breaking Strength B

In the same manner as in the evaluation of the stress relaxation time, the extruded bead was stretched to produce the same sample as the sample for measurement of the stress relaxation time. Then, the same measurement as the measurement of the breaking strength was conducted to obtain the value of breaking strength B.

Example 1

In a 100 L stainless steel autoclave, paraffin wax (1,500 g) and deionized water (60 L) were charged. The autoclave was purged with nitrogen and then brought to a reduced pressure, and n-butyl methacrylate (1 g) and deionized water (0.5 L), were poured and charged into the autoclave. Here, n-butyl methacrylate was charged, so that the content of units based on n-butyl methacrylate became to be 48 mass ppm to all units of the obtainable modified PTFE.

Next, inside of the autoclave was brought to a state of at most the atmospheric pressure, and while stirring the solution in the autoclave, the temperature was raised to 75° C. Thereafter, a solution prepared by dissolving ammonium persulfate (0.11 g) as a polymerization initiator in deionized water (1 L), was injected into the autoclave, to polymerize n-butyl methacrylate.

10 minutes later, the pressure was raised to 1.96 MPa by TFE, and a solution prepared by dissolving ammonium persulfate (0.54 g) and disuccinic acid peroxide (concentration 80 mass %, remainder water) (53 g) in warm water (1 L) of about 70° C., was injected into the autoclave. By 1,379 seconds later, the internal pressure in the autoclave was lowered to 1.89 MPa. Here, the amount of the polymerization initiators (ammonium persulfate and disuccinic acid peroxide) used, was 0.26 mass % to the total amount of TFE used.

Then, TFE was added so as to keep the inner pressure of the autoclave to be 1.96 MPa, to let polymerization of TFE proceed. After adding 1 kg of TFE, a solution prepared by dissolving dodecyl sodium sulfate (44 g) in deionized water (3 L), was supplied while confirming the amount of TFE to be supplied by a flow meter, so that sodium dodecyl sulfate becomes to be from 1.5 to 1.6 g to 1 kg of TFE supplied.

At the time when the amount of added TFE reached 21 kg, the reaction was terminated, and TFE in the autoclave was released to the atmosphere. The polymerization time was 226 minutes.

The obtained aqueous dispersion of modified PTFE was cooled, and the supernatant paraffin wax was removed. The solid content concentration of the aqueous dispersion (concentration of modified PTFE) was about 23 mass %. Further, the average primary particle size of modified PTFE in the aqueous dispersion was 260 nm.

The aqueous dispersion was diluted with pure water to a solid content concentration of 10 mass %, adjusted to 20° C. and stirred, to let modified PTFE particles be coagulated, to obtain a modified PTFE powder. Then, this modified PTFE powder was dried at 250° C.

SSG of the obtained modified PTFE powder was 2.162. The extrusion pressure was 21.6 MPa. The breaking strength was 21.1N. The stress relaxation time was 180 seconds.

Example 2

An aqueous dispersion of modified PTFE was obtained in accordance with the same procedure as described above (Example 1), except that instead of the treatment in which inside of the autoclave was adjusted to a state of at most the atmospheric pressure, and the solution in the autoclave was heated with stirring to 75° C., treatment was conducted in which inside of the autoclave was pressurized to 0.15 MPa by TFE, and the solution in the autoclave was heated with stirring to 75° C.

Various evaluations are summarized in Table 1.

Example 3

A modified PTFE powder was obtained in accordance with the same procedure as in Example 1, except that n-butyl methacrylate was charged so that the content of units based on n-butyl methacrylate became to be 56 mass ppm, to all units in the obtainable modified PTFE, and the amount of TFE used, was changed from 21 kg to 18 kg.

Various evaluations are summarized in Table 1.

Example 4

A modified PTFE powder was obtained in accordance with the same procedure as in Example 3, except that n-butyl methacrylate was changed to vinyl acetate.

Various evaluations are summarized in Table 1.

Example 5

A modified PTFE powder was obtained in accordance with the same procedure as in Example 1, except that n-butyl methacrylate was charged so that the content of units based on n-butyl methacrylate became to be 83 mass ppm to all units in the obtainable modified PTFE, and the amount of TFE used, was changed from 21 kg to 12 kg.

Various evaluations are summarized in Table 1.

Example 6

A modified PTFE powder was obtained in accordance with the same procedure as in Example 5, except that n-butyl methacrylate was changed to vinyl acetate.

Various evaluations are summarized in Table 1.

Example 7

A modified PTFE powder was obtained in accordance with the same procedure as in Example 1, except that n-butyl methacrylate was changed to acrylic acid; acrylic acid was charged so that the content of units based on acrylic acid became to be 100 mass ppm to all units in the obtainable modified PTFE; and the amount of TFE used, was changed from 21 kg to 10 kg.

Various evaluations are summarized in Table 1.

Example 8

At the time of diluting the aqueous emulsion of modified PTFE in Example 2 with pure water to a concentration of 10 mass %, and then adjusting it to 20° C., followed by stirring to coagulate it, the coagulation was conducted by charging 5 mass % of ammonium carbonate to modified PTFE in the coagulation vessel. Then, the water content of the obtained undried modified PTFE fine powder was measured, and based on that value, in a drying tray, the undried modified PTFE fine powder, and an ammonium carbonate aqueous solution (ammonium carbonate concentration of 20 mass %) to be 5 mass % to the modified PTFE, were simultaneously put, and the obtained drying tray was dried at 285° C.

Using the obtained sample, measurements of the breaking strength and the stress relaxation time were conducted. The breaking strength A was 28.2N, and the breaking strength B was 33.8N. The stress relaxation time was 176 seconds.

Comparative Example 1

A modified PTFE powder was obtained in accordance with the same procedure as in Example 5, except that n-butyl methacrylate was changed to vinyl sulfonic acid.

Various evaluations are summarized in Table 1.

In Table 1, "BMA" represents n-butyl methacrylate, "VAc" represents vinyl acetate, "AA" represents acrylic acid, and "VSa" represents vinylsulfonic acid.

The "content (mass ppm)" represents the content of units A to all units in the obtainable modified PTFE.

The "solids (mass %)" represents the solid content concentration of the aqueous dispersion (concentration of modified PTFE).

TABLE 1

|   |   | Example 1 | Example 2 | Example 3 | Example 4 | Example 5 | Example 6 | Example 7 | Comparative Example 1 |
|---|---|---|---|---|---|---|---|---|---|
| Monomer A | Type | BMA | BMA | BMA | VAc | BMA | VAc | AA | VSa |
|  | Content (mass ppm) | 48 | 48 | 56 | 56 | 83 | 83 | 100 | 83 |
| TFE polymerization conditions | Polymerization time (min) | 226 | 214 | 171 | 170 | 116 | 115 | 148 | 149 |
|  | TFE supply amount (kg) | 21 | 21 | 18 | 18 | 12 | 12 | 10 | 12 |
| Various evaluations | Solids (mass %) | 23.3 | 23.5 | 20.7 | 21.4 | 15.4 | 15.4 | 12.9 | 15.7 |
|  | Average primary particle size (μm) | 0.26 | 0.26 | 0.24 | 0.29 | 0.20 | 0.24 | 0.24 | 0.17 |
|  | Standard specific gravity | 2.162 | 2.163 | 2.164 | 2.163 | 2.169 | 2.167 | 2.167 | 2.176 |
|  | Extrusion pressure (MPa) | 21.6 | 22.9 | 23.3 | 21.9 | 24.0 | 23.0 | 23.9 | 25.7 |
|  | Breaking strength A (N) | 21.1 | 20.8 | 18.8 | 17.3 | 8.7 | 19.9 | 16.8 | Not stretchable |
|  | Stress relaxation time (sec) | 180 | 174 | 157 | 150 | 119 | 120 | 144 | 99 |
|  | Breaking strength B (N) | 26.5 | 27.5 | 28.4 | 23.3 | 27.8 | 25.1 | 25.5 | 20.4 |

As shown in Table 1, the modified PTFE of the present invention was excellent in breaking strength.

This application is a continuation of PCT Application No. PCT/JP2018/035492, filed on Sep. 25, 2018, which is based upon and claims the benefit of priority from Japanese Patent Application No. 2017-187990 filed on Sep. 28, 2017. The contents of those applications are incorporated herein by reference in their entireties.

What is claimed is:

1. A modified polytetrafluoroethylene comprising a first polymer having first units based on tetrafluoroethylene, and a second polymer having second units based on a monomer represented by the formula (1-1), wherein the content of the units based on a monomer represented by the formula (1-1) is from 10 to 500 mass ppm, to all units in the modified polytetrafluoroethylene, and the standard specific gravity is from 2.155 to 2.175,

$$CH_2=CR^1-CO-O-R^3, \quad \text{Formula (1-1)}$$

wherein $R^1$ represents a hydrogen atom or an alkyl group, and $R^3$ represents a $C_{2-6}$ alkyl group, wherein the content of the second units is from 90 mass % to 100 mass % to all units in the second polymer.

2. The modified polytetrafluoroethylene according to claim 1, wherein the content of the units based on a monomer represented by the formula (1) is from 30 to 100 mass ppm, to all units in the polytetrafluoroethylene.

3. The modified polytetrafluoroethylene according to claim 1, wherein the modified polytetrafluoroethylene is in a particulate form, and its average primary particle size is from 0.20 to 0.30 μm.

4. The modified polytetrafluoroethylene according to claim 1, which is for paste extrusion molding.

5. A molded product formed by paste extrusion molding of the modified polytetrafluoroethylene as defined in claim 1.

6. A method for producing a stretched porous material, which comprises subjecting the modified polytetrafluoroethylene as defined in claim 1 to paste extrusion to obtain an extruded bead, and stretching the extruded bead to obtain a stretched porous material.

* * * * *